(12) United States Patent
Sugiyama et al.

(10) Patent No.: US 9,061,708 B2
(45) Date of Patent: Jun. 23, 2015

(54) VEHICLE BODY SIDE STRUCTURE

(71) Applicant: HONDA MOTOR CO., LTD., Tokyo (JP)

(72) Inventors: Hiroto Sugiyama, Wako (JP); Yusuke Takayama, Wako (JP); Shigeyuki Nagai, Wako (JP); Shouji Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/140,013

(22) Filed: Dec. 24, 2013

(65) Prior Publication Data

US 2014/0191535 A1 Jul. 10, 2014

(30) Foreign Application Priority Data

Jan. 7, 2013 (JP) ................................. 2013-000501

(51) Int. Cl.
*B60J 5/04* (2006.01)
*B62D 25/02* (2006.01)
*B62D 25/16* (2006.01)

(52) U.S. Cl.
CPC ................ *B62D 25/02* (2013.01); *B60J 5/0443* (2013.01); *B62D 25/16* (2013.01); *B60J 5/0429* (2013.01); *B60J 5/0458* (2013.01)

(58) Field of Classification Search
CPC ............ B60K 15/04; B60K 2015/0474; B60J 5/0425; B60J 5/0426; B60J 5/0427; B60J 5/0429; B60J 5/0448; B60J 5/0455; B60J 5/06; B62D 25/02; B62D 21/09; B62D 25/025; B62D 25/04; B62D 25/087; B62D 25/16; B62D 25/2036

USPC ............ 296/193.05, 187.08, 187.12, 193.07, 296/203.03; 105/420, 418, 248, 251, 406.1, 105/409, 228

See application file for complete search history.

(56) References Cited

U.S. PATENT DOCUMENTS

| 8,282,154 | B2 * | 10/2012 | Maruyama ............... 296/193.05 |
| 8,303,028 | B2 * | 11/2012 | Domlovil et al. ........ 296/193.05 |
| 2009/0008965 | A1 * | 1/2009 | Chen et al. .................... 296/205 |
| 2009/0236871 | A1 * | 9/2009 | Shibasaki ................... 296/146.6 |
| 2011/0278880 | A1 * | 11/2011 | Tsuyuzaki et al. ....... 296/187.11 |

FOREIGN PATENT DOCUMENTS

| JP | 04-27619 A | 1/1992 |
| JP | 07-290953 A | 11/1995 |
| JP | 2007-145099 A | 6/2007 |

(Continued)

OTHER PUBLICATIONS

Office Action dated Oct. 7, 2014, issued in Japanese Application No. 2013-000501. (2 pages).

*Primary Examiner* — Glenn Dayoan
*Assistant Examiner* — Sunsurraye Westbrook
(74) *Attorney, Agent, or Firm* — Westerman, Hattori, Daniels & Adrian, LLP

(57) ABSTRACT

A vehicle body side structure includes a house reinforcing member mounted on a front upper portion of an inner wheel house, the house reinforcing member having a front connecting portion connected to a flange of the inner wheel house, a panel portion extending from the front connecting portion in an inclined manner, and a rear connecting portion connected to a rear bulkhead. A rear end of a door beam is provided outwardly of a striker in a vehicle width direction, and the rear end of the door beam, the striker, and the front connecting portion are provided in an overlapping manner from outside to inside in the vehicle width direction.

9 Claims, 15 Drawing Sheets

(56) References Cited

FOREIGN PATENT DOCUMENTS

| JP | 2008-189296 A | 8/2008 |
| JP | 2009-143476 A | 7/2009 |
| JP | 2010-167872 A | 8/2010 |
| JP | 2010-234962 A | 10/2010 |

\* cited by examiner

US 9,061,708 B2

VEHICLE BODY SIDE STRUCTURE

CROSS REFERENCES TO RELATED APPLICATIONS

The present application claims priority under 35 U.S.C. §119 to Japanese Patent Application No. 2013-000501, filed Jan. 7, 2013, entitled "Vehicle Body Side Structure." The contents of this application are incorporated herein by reference in their entirety.

TECHNICAL FIELD

The present disclosure relates a vehicle body side structure in which rear a bulkhead is provided inwardly of a rear wheel house in a vehicle width direction, and a door opening frame and a side door are provided forwardly of the rear wheel house, the side door allowing the door opening frame to be opened and closed.

BACKGROUND

In a known vehicle body side structure, a rear wheel house is provided with a reinforcing member which is connected to a seat back plate via a rear seat bracket. This vehicle body side structure, when receiving an impact load to the vicinity of the rear wheel house from the side of the vehicle, allows the impact load to be transmitted to the reinforcing member via the rear wheel house. The load transmitted to the reinforcing member is transferred via the rear seat bracket to the seat back plate Which supports the transmitted load (for example, see Japanese Patent No. 4293180).

SUMMARY

However, when the vehicle body side structure disclosed in Japanese Patent No. 4293180 receives an impact load from the side of the vehicle to a portion (for example, the center pillar) apart from the rear wheel house, the impact load cannot be distributed to the reinforcing member via the rear wheel house. The portion which has received the impact load may be deformed toward the vehicle cabin. From this viewpoint, the vehicle body side structure is susceptible to improvement.

The present disclosure provides a vehicle body side structure which allows an impact load to be distributed to the rear wheel house, the impact load being applied from the side of the vehicle to a portion apart from the rear wheel house.

A first aspect of the disclosure provides a vehicle body side structure, in which a rear bulkhead is provided inwardly of a rear wheel house in a vehicle width direction, a side outer panel is connected outwardly of the rear wheel house in the vehicle width direction, a door opening frame having an opening openable and closable by a side door is formed on the side outer panel, a striker is provided at a rear portion of the door opening frame, a door latch retainable on the striker is provided inwardly of the side door, and a door beam for reinforcement is provided inside the side door, the vehicle body side structure including a house reinforcing member mounted on a front portion of the rear wheel house, the house reinforcing member including: a front connecting portion which is connected to a flange of the rear wheel house and provided inwardly of the striker in the vehicle width direction, a panel portion which extends along the front portion of the rear wheel house from the front connecting portion, the panel portion being inclined in a forward direction of the vehicle and outwardly in the vehicle width direction, and a rear connecting portion which projects from a rear end of the panel portion and is connected to the rear bulkhead. A rear end of the door beam is provided outwardly of the striker in the vehicle width direction, and the rear end of the door beam, the striker, and the front connecting portion are provided in an overlapping manner in this order from outside to inside in the vehicle width direction. Thus when an impact load is applied from the side of the vehicle to a portion apart from the rear wheel house, the impact load can be transmitted to the door beam. Furthermore, the load transmitted to the door beam can be transferred (distributed) to the rear end of the door beam, then transmitted from the rear end to the front connecting portion via the striker. The distributed load is transmitted to the from connecting portion, and the house reinforcing member is thereby bent and deformed around the rear connecting portion inwardly in the vehicle width direction. The bending deformation of the house reinforcing member causes the outer side wall (the wall facing the outside of the vehicle) of the house reinforcing member to be deformed in the tensile direction, and causes the inner side wall (the wall facing the vehicle cabin) of the house reinforcing member to be deformed in the compressing direction. The deformation of the house reinforcing member in the tensile direction and the compressing direction causes the load transmitted to the house reinforcing member to be transferred to the rear bulkhead (member with high rigidity) via the house reinforcing member and can be supported by the rear bulkhead. Thus, severe deformation of the rear wheel house toward the vehicle cabin can be prevented. In addition, the load transmitted to the door beam is transferred (distributed) to the rear end of the door beam, and the distributed load can be transmitted to the rear bulkhead via the house reinforcing member. That is, when an impact load is applied from the side of the vehicle to a portion apart from the rear wheel house, the applied impact load can be distributed to the rear wheel house. In this manner, it is possible to prevent severe deformation of a portion toward the vehicle cabin due to an impact load applied from the side of the vehicle, the portion being apart from the rear wheel house.

A second aspect of the disclosure is that the front connecting portion of the house reinforcing member is inclined downward in the forward direction of the vehicle, the house reinforcing member has a plurality of upper and lower beads, at least one of the beads is disposed at a position at the same height as a retaining portion where the door latch is retained on the striker, and another bead formed under the at least one bead is inclined upward from a front end in a rearward direction of the vehicle and merges with a central portion of the at least one bead. Thus, a load can be properly transmitted from the retaining portion to the house reinforcing member with reduced size of the house reinforcing member. Thus, the house reinforcing member can be reduced in size. In this manner, the house reinforcing member can be reduced in weight due to the reduced size thereof.

A third aspect of the disclosure is that a center pillar having a retractor opening in a lower portion for housing a retractor for a seat belt and configured to rotatably support a front portion of the side door is further included. A front end of the door beam is disposed outwardly of the retractor opening in the vehicle width direction so as to face the retractor opening. Thus, when an impact load is applied to a lower portion of the center pillar from the side of the vehicle, the lower portion of the center pillar can be deformed toward the vehicle cabin and the front end of the door beam can be moved toward the vehicle cabin. In this manner, the impact load can be absorbed by the deformation of the lower portion of the center pillar and the further movement of the front end of the door beam. In addition, the rear end of the door beam as well as the front end thereof can be moved toward the vehicle cabin. Thus, the load transmitted (distributed) to the rear end of the door beam can be transferred to the house reinforcing member. Consequently, the transferred load can be absorbed by the house reinforcing member due to bending deformation of the house reinforcing member caused by the transferred load.

A fourth aspect of the disclosure is that a center pillar having a less rigid portion in a lower portion and configured to rotatably support the front portion of the side door is further included. The front end of the door beam is disposed outwardly of the less rigid portion in the vehicle width direction so as to face the less rigid portion. Thus, when an impact load is applied to the lower portion (less rigid portion) of the center pillar from the side of the vehicle, the lower portion of the center pillar can be deformed toward the vehicle cabin and the front end of the door beam can be moved toward the vehicle cabin. In addition, the rear end of the door beam along with the front end thereof is moved toward the vehicle cabin, and thus the load transmitted (distributed) to the rear end can be transferred to the house reinforcing member. Consequently, the transferred load can be absorbed by the house reinforcing member due to bending deformation of the house reinforcing member caused by the transferred load. In addition, the less rigid portion is formed in the lower portion of the center pillar, and thus the less rigid portion is disposed near the lower body of a passenger. Therefore, the less rigid portion (that is, the lower portion) is deformed toward the vehicle cabin by the impact load, and thus a portion of the center pillar located near the upper body (chest) of the passenger can be separated (moved) away from the chest of the passenger. Consequently, the impact load is prevented from being applied to the chest of the passenger.

A fifth aspect of the disclosure is that an opening flange of the door opening frame is formed at a front flange of the rear wheel house and the side outer panel, the striker on which the door latch is retained is provided on an opening step wall of the side outer panel, the opening step wall being provided outwardly of the opening flange in the vehicle width direction and extending in the vehicle width direction, and the front connecting portion and the rear end of the door beam are disposed so as to face the opening step wall. Therefore, the retaining portion between the striker and the door latch can be arranged on the line joining the front connecting portion and the rear end of the door beam. Consequently, the load transmitted (distributed) to the rear end of the door beam can be substantially linearly transferred to the front connecting portion of the house reinforcing member via the rear end of the door beam and the retaining portion, and thus the transmission efficiency of the load can be improved.

A sixth aspect of the disclosure is that the striker is fixed to a striker mounting bracket which is disposed on the opening step wall of the side outer panel, the side door has a door step wall which faces the opening step wall of the side outer panel, and the door step wall is connected to the rear end of the door beam. Therefore, the striker mounting bracket can be arranged on the line joining the front connecting portion and the rear end of the door beam. Consequently, the load transmitted (distributed) to the rear end of the door beam can be substantially linearly transferred to the front connecting portion of the house reinforcing member via the rear end of the door beam, the striker, and the striker mounting bracket, and thus the transmission efficiency of the load can be improved.

A seventh aspect of the disclosure is that the front end of the door beam is fixed to the front portion of the side door via a beam mounting bracket, and the beam mounting bracket is fixed to a door hinge which is one of door hinges via which the side door is supported by the center pillar, the door hinge being disposed at a lowest position among the door hinges. Thus, when an impact load is applied to a lower portion of the center pillar from the side of the vehicle, the applied impact load can be transmitted to the front end of the door beam via the lowest door hinge and the beam mounting bracket. Therefore, the load transmitted to the front end can be distributed to the rear end of the door beam, and the load distributed (transmitted) to the rear end can be transferred to the house reinforcing member. Consequently, the transferred load can be absorbed by the house reinforcing member due to bending deformation of the house reinforcing member caused by the transferred load.

BRIEF DESCRIPTION OF THE DRAWINGS

The advantages of the disclosure will become apparent in the following description taken in conjunction with the following drawings.

DETAILED DESCRIPTION

Hereinafter, the embodiments for carrying out the present disclosure will be described with reference to the accompanying drawings. It is to be noted that "front (Fr)", "rear (Rr)", "left (L)", and "right (R)" are directions with respect to a driver.

Embodiment

Figure 1:
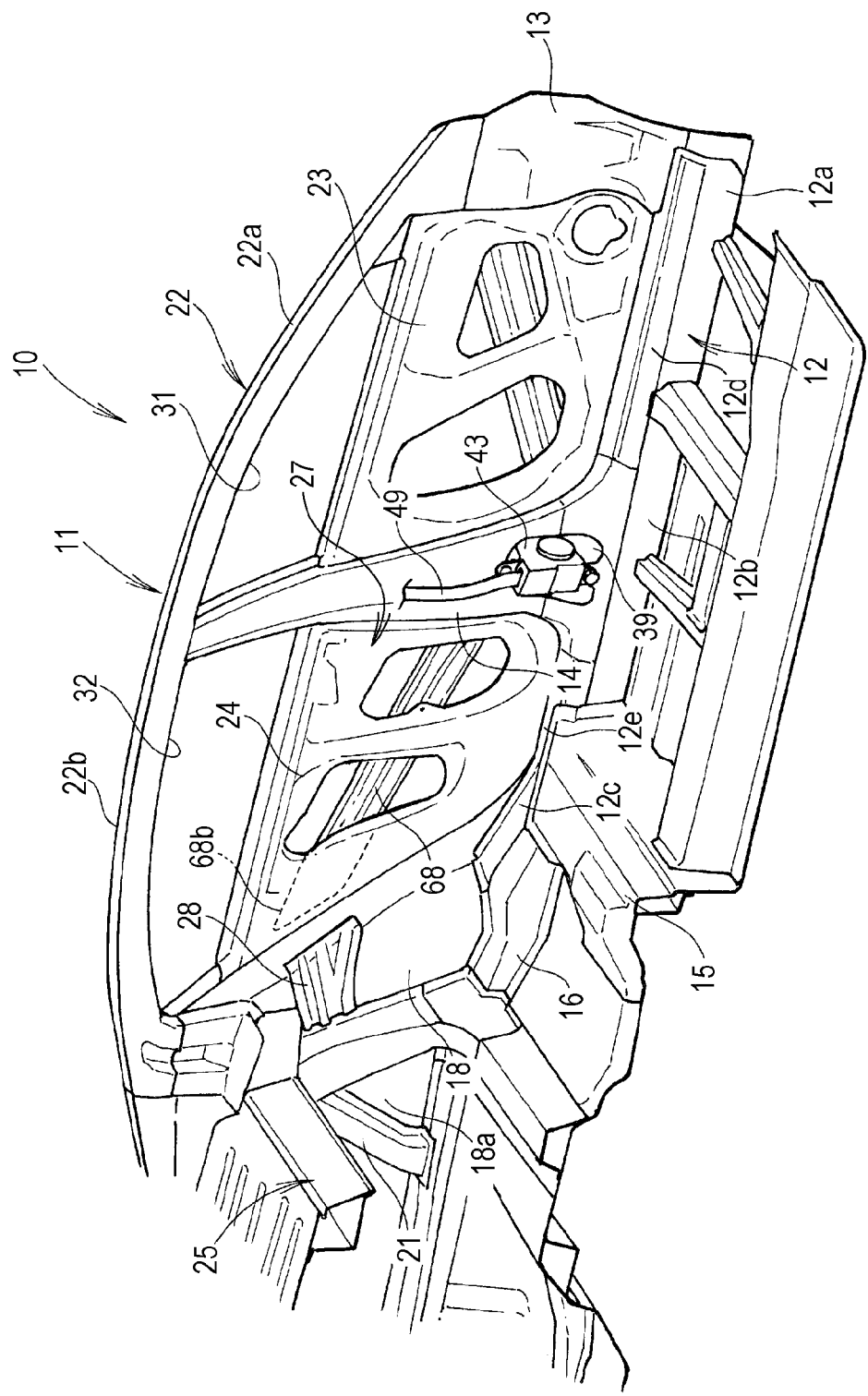
FIG. 1 is a perspective view illustrating a vehicle body side structure according to the present disclosure.

A vehicle body side structure 10 according to an embodiment will be described. As illustrated in FIG. 1, the vehicle body side structure 10 includes (is provided with) a side sill 12 provided at a side portion of a vehicle body 11 and extending in the longitudinal direction of the vehicle, a front pillar 13 provided upright at a front end 12a of the side sill 12, a center pillar 14 provided upright at a central portion 12b of the side sill 12, a cross member 15 provided at a rear portion 12c of the side sill 12, and a rear frame 16 extending in the rearward direction of the vehicle from the cross member 15.

In addition, the vehicle body side structure 10 includes (is provided with) a rear wheel house 18 provided in the rear frame 16, a rear pillar 21 provided upright at a rear portion 10a of the rear wheel house 18, and a roof rail 22 extending from the front pillar 13 to the rear pillar 21.

The vehicle body side structure 10 further includes (is provided with) a front side door 23 and a rear side door 24 (side doors) which are provided in the side portion of vehicle body 11, a rear bulkhead 25 connected to the rear wheel house 18, a side outer panel 26 (see FIG. 7) connected to the outside of the rear wheel house 18 in the vehicle width direction, and a house reinforcing member 28 provided in the rear wheel house 18.

A front door opening frame 31 is formed by a front half portion 12d of the side sill 12, the front pillar 13, the center pillar 14, and a front half portion 22a of the roof rail 22 at the front side of the vehicle body 11. The front side door 23 is supported by the front door opening frame 31 in a freely openable and closable manner. A rear door opening frame (door opening frame) 32 is formed by a rear half portion 12e of the side sill 12, the center pillar 14, the rear pillar 21 including the rear wheel house 18), and a rear half portion 22b of the roof rail 22 at the rear side of the vehicle body 11. The rear side door 24 is supported by the rear door opening frame 32 in a freely openable and closable manner.

A door front wall (front wall) 64 (see FIG. 3) of the rear side door 24 is rotatably supported by the center pillar 14. The door beam 68 is provided in an inside 27 of the rear side door 24 in an inclined manner, and a door latch device 88 (see FIG. 7) is provided in the vicinity of a rear end 68b of the door beam 68.

Figure 2:
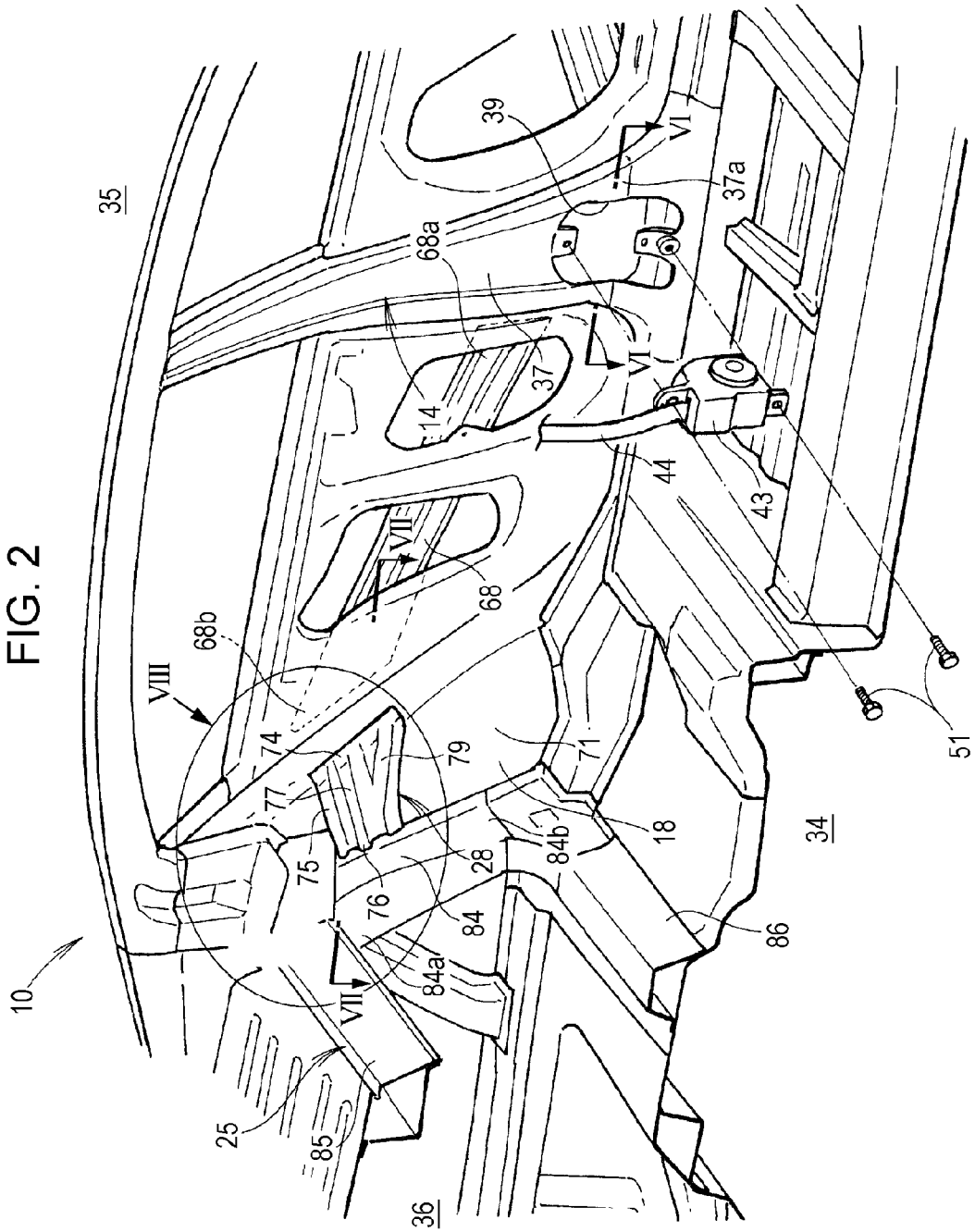
FIG. 2 is a cross-sectional view illustrating the principal part of the vehicle body side structure of FIG. 1.
Figure 3:
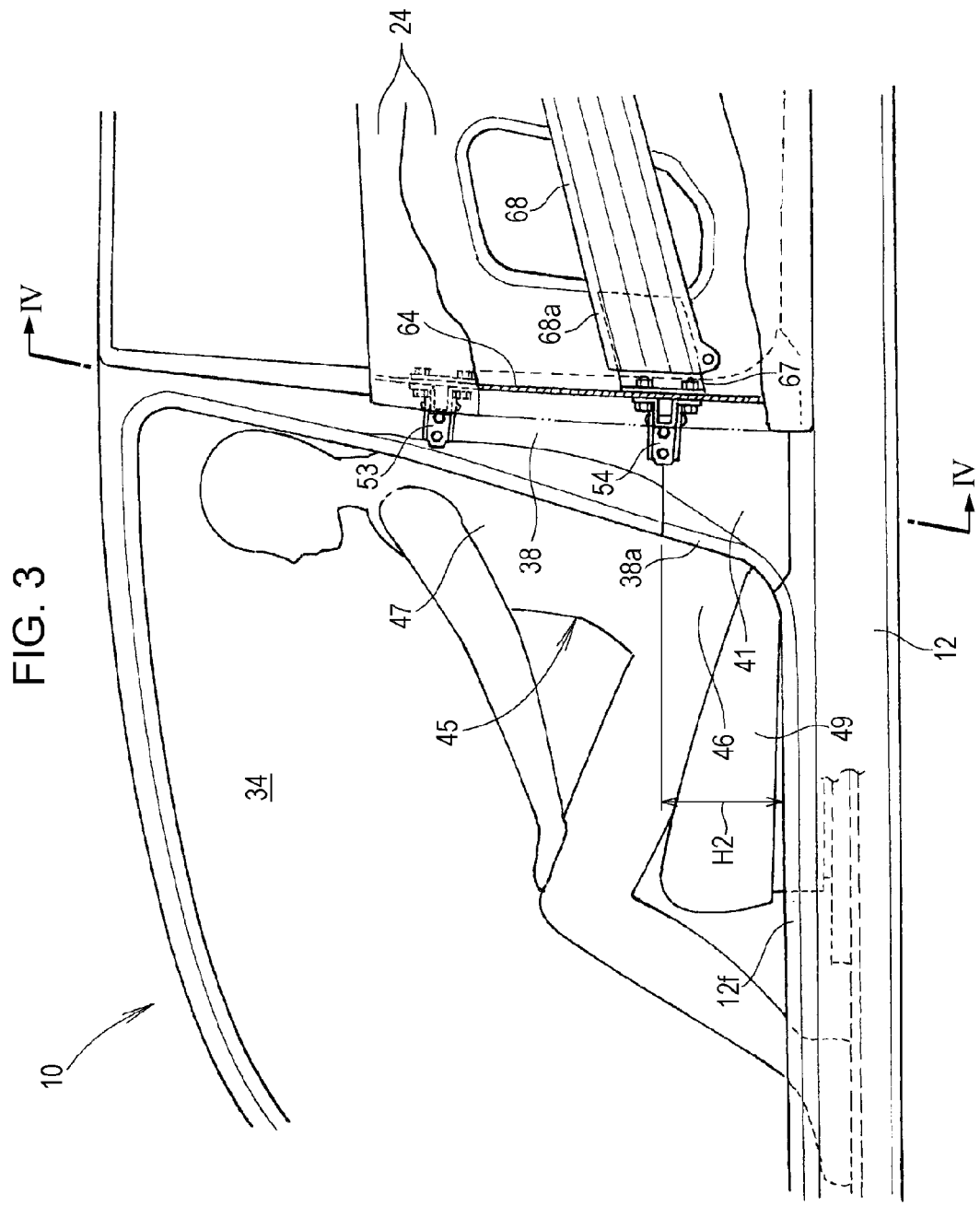
FIG. 3 is a side view illustrating the vehicle body side structure according to the present disclosure.

As illustrated in FIGS. 2 and 3, the center pillar 14 has a retractor opening 39 which is formed in a lower portion 37a of an inner wall 37 facing a vehicle cabin 34, and less rigid portion 41 which is formed in a lower portion 38a of an outer wall 38 facing a vehicle outside 35. The retractor opening 39 and the less rigid portion 41 are both provided at the same height.

Figure 4:
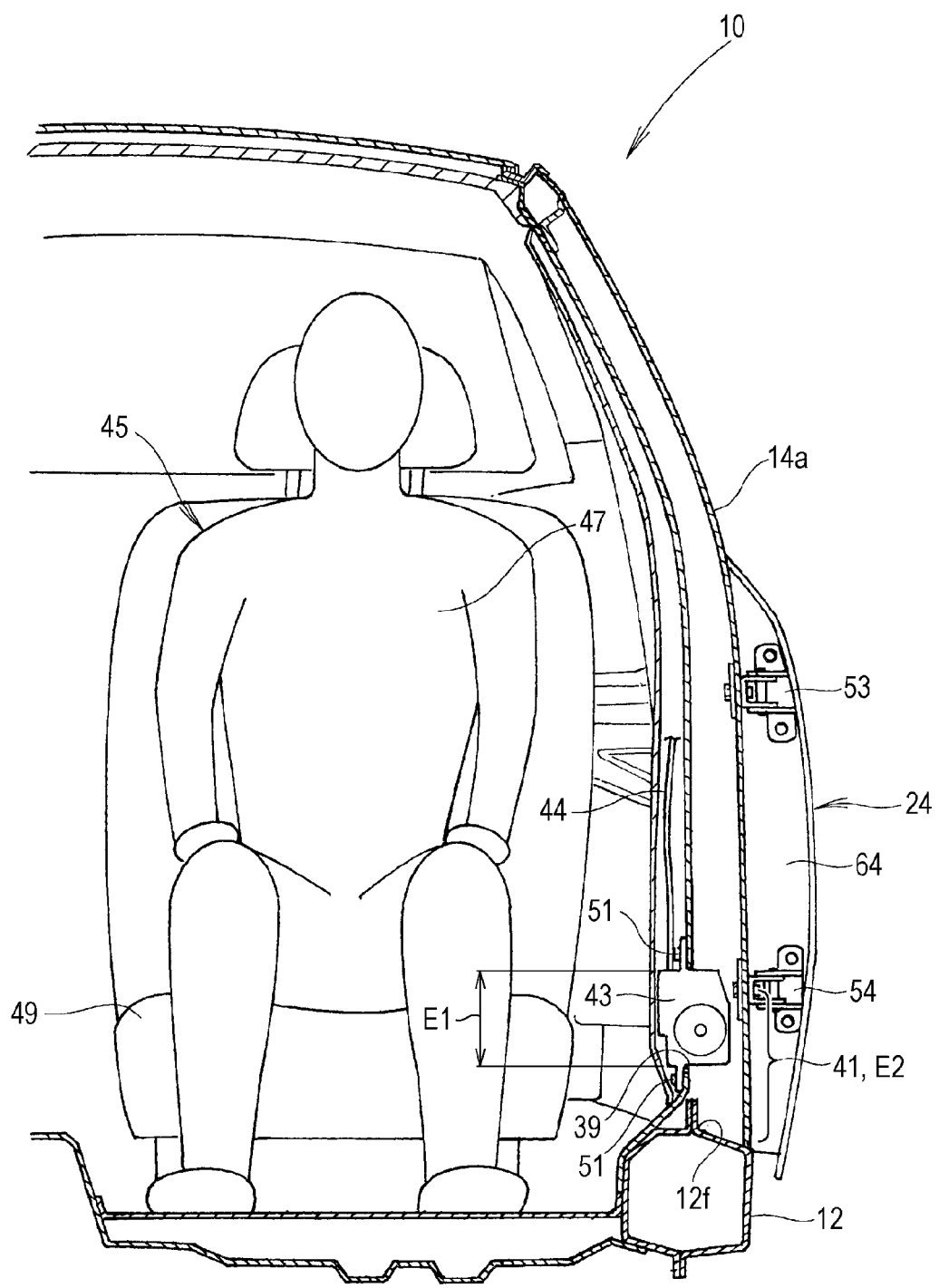
FIG. 4 is a cross-sectional view taken along line IV-IV of FIG. 3.

As illustrated in FIG. 4, the retractor opening 39 is open so as to be able to house a retractor 43. The retractor opening 39 is formed in a range E1 between an upper end 12f of the side sill 12 and the center of hip 46 (see FIG. 3) (a position slightly higher than a seat cushion 49) of a passenger 45. The retractor opening 39 houses the retractor 43 which is mounted on the inner wall 37 with a bolt 51 (see also FIG. 2). The retractor 43 has a function of winding the seat belt 44.

The formation of the retractor opening 39 in the lower portion 37a of the center pillar 14 facilitates the lower portion 37a to be deformed toward the vehicle cabin 34 when an impact load is applied to the lower portion 37a from the side of the vehicle. The impact load can be absorbed by the deformation of the lower portion 37a of the center pillar 14.

The less rigid portion 41 is formed by performing slow cooling when the center pillar 14 is molded by hot pressing in which the center pillar 14 is heated and compressed. Similarly to the retractor opening 39, the less rigid portion 41 is formed in a range E2 between the upper end 12f of the side sill 12 and the center of the hip 46 (see FIG. 3) (position slightly higher than the seat cushion 49) of the passenger 45.

The formation of the less rigid portion 41 at the lower portion 38a of the center pillar 14 facilitates the lower portion 38a to be deformed toward the vehicle cabin 34 when an impact load is applied to the lower portion 39a from the side of the vehicle. The impact load can be absorbed by the deformation of the lower portion 38a of the center pillar 14.

In addition, the formation of the retractor opening 39 in the lower portion 37a of the center pillar 14 and the formation of the less rigid portion 41 at the lower portion 38a allow the retractor opening 39 and the less rigid portion 41 to be disposed near the lower body (hip) 46 (see FIG. 3) of the passenger 45. Therefore, the less rigid portion 41 (that is, the lower portion) is deformed toward the vehicle cabin 47 by the impact load, and thus the portion 14a of the center pillar 14 located near the upper body (chest) 47 of the passenger 45 can be separated (moved) away from the chest 47 of the passenger 45.

Figure 5:
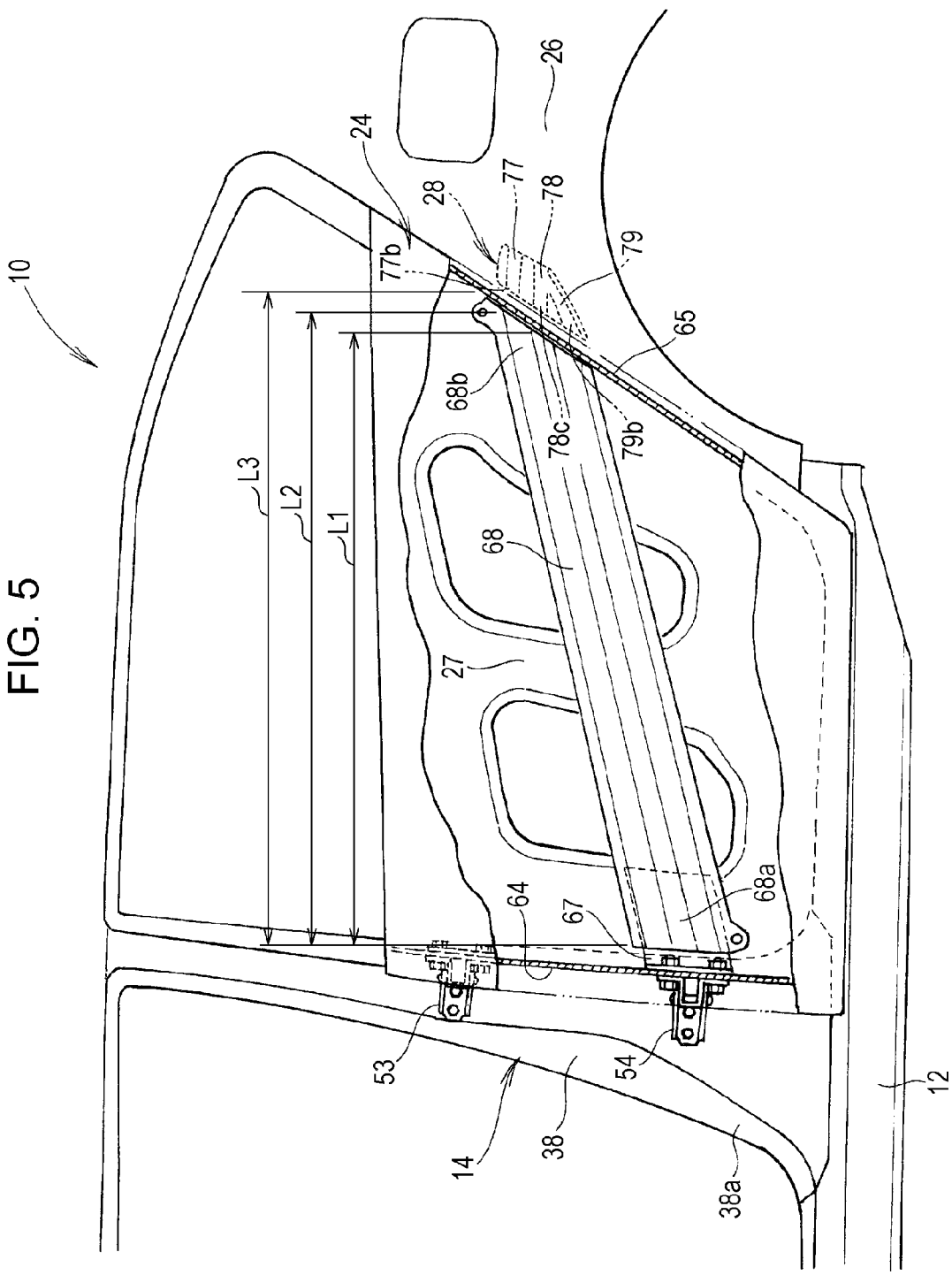
FIG. 5 is a side view illustrating the manner in which a rear side door is mounted on a center pillar via upper and lower door hinges according to the present disclosure.

As illustrated in FIG. 5, the rear side door 24 is supported by the center pillar 14 via upper and lower door hinges (a plurality of door hinges) 53, 54 in a freely openable and closable manner. The upper and lower door hinges 53, 54 are formed of the same component. The upper door hinge 53 is provided at the center of the center pillar 14, and the lower door hinge 54 is provided in the vicinity of the lower portion (that is, the lower portion 38a of the outer wall 38) of the center pillar 14. Thus, the lower door hinge 54 is provided at the (lowest) position below the upper door hinge.

Figure 6:
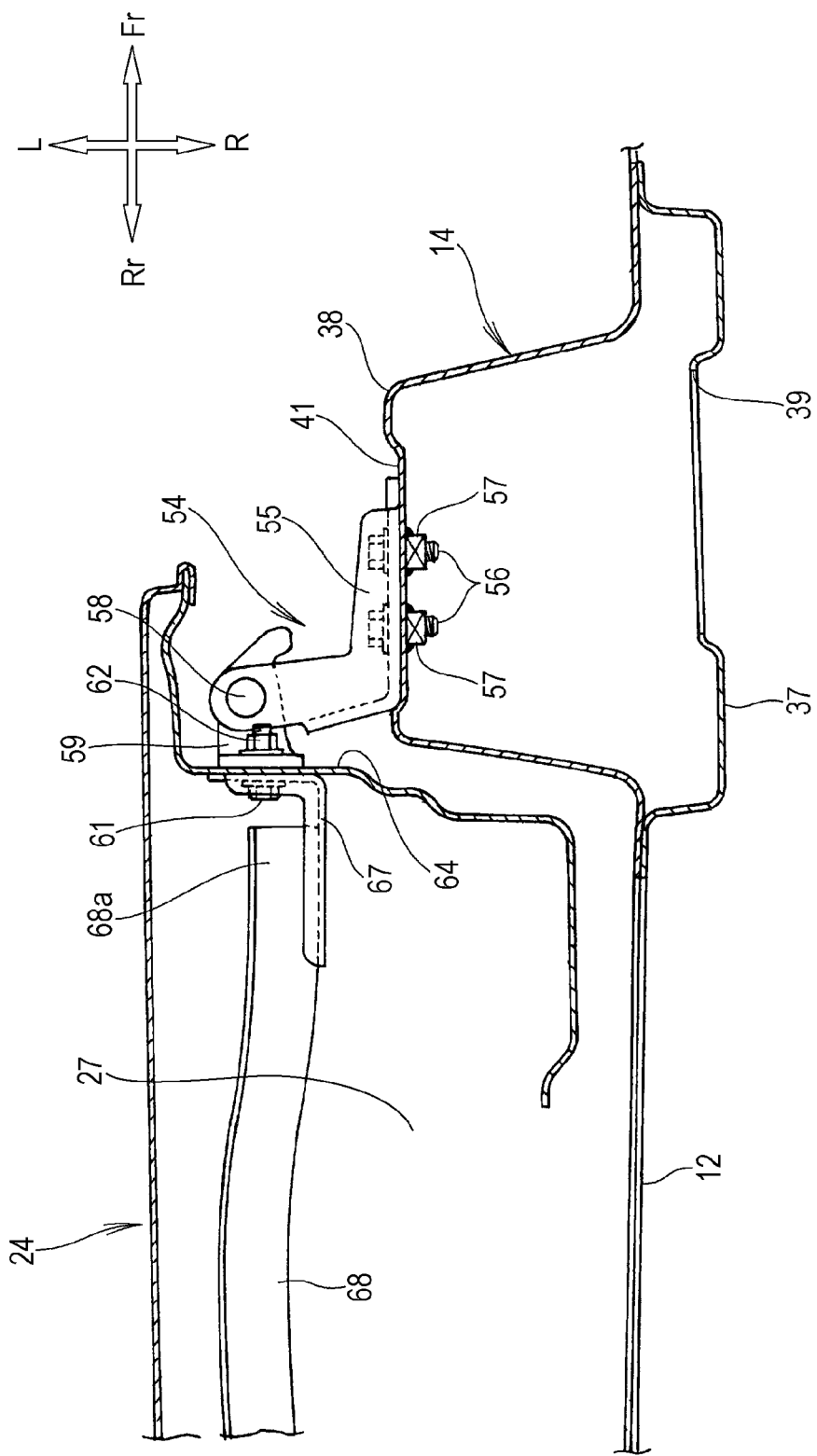
FIG. 6 is a cross-sectional view taken along line VI-VI of FIG. 2.

As illustrated in FIG. 6, a retaining bracket 55 for the lower door hinge 54 is mounted on the outer wall 38 of the center pillar 14 with a bolt 56 and a nut 57. In addition, a rotation bracket 59 is swingably connected to the retaining bracket 55 via a support axle 58. The rotation bracket 59 along with a beam mounting bracket 67 is secured to the door front wall 64 of the rear side door 24 with a bolt 61 and a nut 62. Thus, the rear side door 24 (door front wall 64) is rotatably supported by the outer wall 38 of the center pillar 14.

In this state, the beam mounting bracket 67 is fixed to the lower door hinge 54 via the door front wall 64 of the rear side door 24. A front end 68a of the door beam 68 is connected to the beam mounting bracket 67. By connecting the front end 68a of the door beam 68 to the beam mounting bracket 67, the front end 68a of the door beam 68 is connected to the door front wall 64 of the rear side door 24 via the beam mounting bracket 67.

In this manner, the front end 68a of the door beam 68 is fixed to the door front wall 64 of the rear side door 24 via the beam mounting bracket 67 which is fixed to the lower door hinge 54 at the lowest position. Thus, when an impact load is applied to the lower portion 38a (see FIG. 5) of the center pillar 14 (outer wall 38) from the side of the vehicle, the applied impact load can be transmitted to the front end 68a of the door beam 68 via the lowest door hinge 54 and the beam mounting bracket 67.

Figure 7:
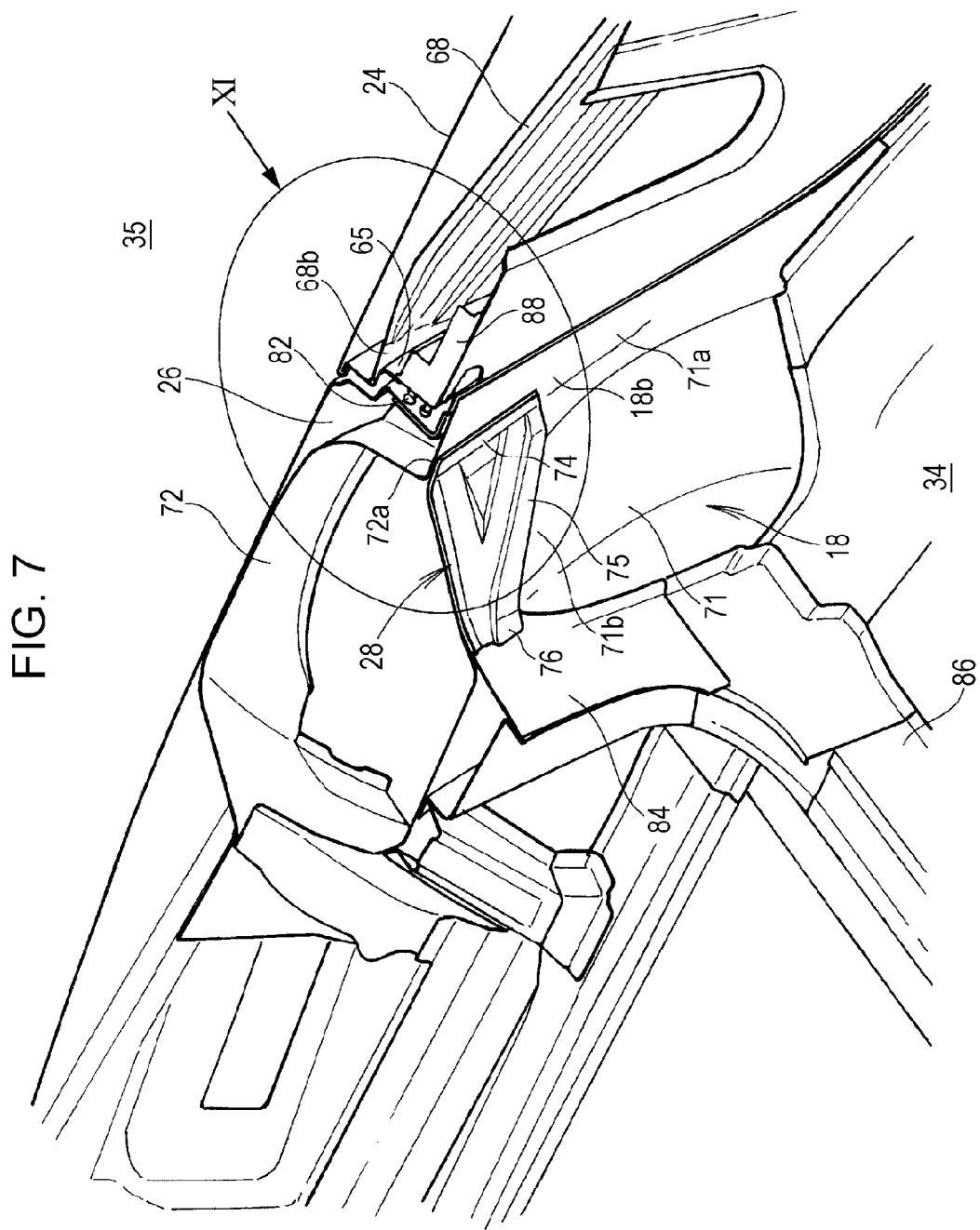
FIG. 7 is a cross-sectional view taken along line VII-VII of FIG. 2.

As illustrated in FIG. 5, the front end 60a of the door beam 68 is mounted so as to face the lower portion (the lower portion 30a of the outer wall 38) of the center pillar 14, and the rear end 68b of the door beam 68 is formed so as to face the house reinforcing member 28 (see FIG. 7). The door beam 68 is a reinforcing member which is provided in the inside 27 of the rear side door 24, and upwardly inclined from the front end 68a to the rear end 68b with an inclination angle of θ1.

Returning to FIG. 6, the front end 68a of the door beam 68 is disposed outwardly of the retractor opening 39 in the vehicle width direction so as to face the retractor opening 39. In addition, the front end 68a of the door beam 68 is disposed outwardly of the less rigid portion 41 in the vehicle width direction so as to face the less rigid portion 41.

Therefore, when an impact load is applied to the lower portions 37a, 38a of the center pillar 14 (the inner wall 37, the outer wall 38) from the side of the vehicle, the lower portions 37a, 38a are deformed toward the vehicle cabin 34, and thus the front end 68a of the door beam 68 can be moved toward the vehicle cabin 34. In this manner, the impact load can be absorbed by the deformation of the lower portions 37a, 38a of the center pillar 14 and the further movement of the front end 62a of the door beam 68.

As illustrated in FIG. 5, the rear end 68b of the door beam 68 along with the front end 68a of the door beam 68 can be moved toward the vehicle cabin 34. Thus, the load transmitted (distributed) to the rear end 68b of the door beam 68 can be transferred to the house reinforcing member 28 (see FIG. 2). Consequently, the transferred load can be absorbed by the house reinforcing member 28 due to the bending deformation of the house reinforcing member 28 caused by the transferred load.

As illustrated in FIGS. 2 and 7, the house reinforcing member 28 is provided in the rear wheel house 18 so as to fade the rear end 68b of the door beam 68. The rear wheel house 18 has an inner wheel house 71 which faces the vehicle cabin 34, and an outer wheel house 72 which faces the vehicle outside 35.

By connecting a flange (flange of the rear wheel house) 71a of the inner wheel house 71 and a flange 72a of the outer wheel house 72, the rear wheel house 18 is formed so as to house the upper half of the rear wheel. A front flange 18b of the rear wheel house 18 is formed by connecting the flange 71a of the inner wheel house 71 and the flange 72a the outer wheel house 72.

Figure 8:
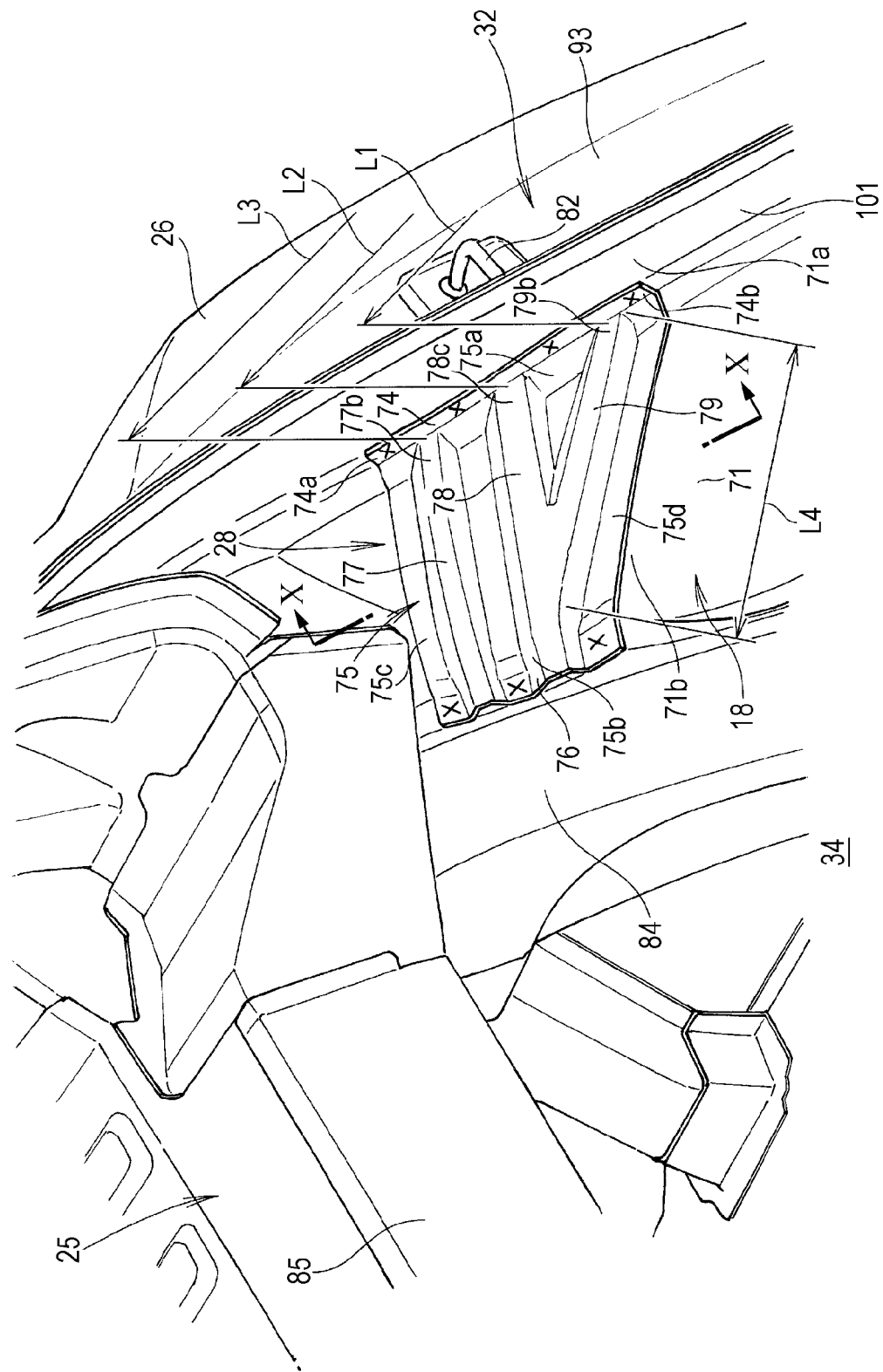
FIG. 8 is an enlarged view of portion VIII of FIG. 2.

As illustrated in FIGS. 7 and 8, the house reinforcing member 28 is mounted on a front upper portion (front portion of the rear wheel house) 71b of the inner wheel house 71. The house reinforcing member 28 has a front connecting portion 74 connected to the flange 71a of the inner wheel house 71, a panel portion 75 extending from the front connecting portion 74, a rear connecting portion 76 projecting from the rear edge (rear end) 75b of the panel portion 75, and an upper bead 77, a middle bead 78, and a lower bead 79 (a plurality of beads) for reinforcement.

The front connecting portion 74 is connected to the flange 71a of the inner wheel house 71, and is thereby provided inwardly of a striker 82 and the rear end 68b of the door beam 68 in the vehicle width direction. The front connecting portion 74 is inclined downward toward the front of the vehicle (that is, from the upper end 74a to the lower end 74b).

The panel portion 75 extends along the front upper portion 71b of the inner wheel house 71 from the front connecting portion 74, the panel portion 75 extending obliquely in the rearward direction of the vehicle and inwardly in the vehicle width direction. The panel portion 75 is formed in a substantially trapezoidal shape with a front side 75a, a rear side 75b, an upper side 75c, and a lower side 75d. The front side 75a is inclined downward in the forward direction of the vehicle along the front connecting portion 74, and the rear side 75b is formed along the rear connecting portion 76.

The upper side 75c is formed substantially horizontally, and the lower side 75d extends from the rear side 75b to the front side 75a, the lower side 75d being inclined downward and extending in the forward direction of the vehicle and outwardly in the vehicle width direction. Thus, the rear side 75b is formed to have a smaller dimension than that of the front side 75a.

The rear connecting portion 76 projects from the rear side 75b of the panel portion 75 and is connected to a left leg 84 of the rear bulkhead 25. That is, the panel portion 75 extends along the front upper portion 71b of the inner wheel house 71 from the rear connecting portion 76 to the front connecting portion 74, the panel portion 75 being inclined in the forward direction of the vehicle and outwardly in to vehicle width direction.

Here, as illustrated in FIG. 2, the rear bulkhead 25 is provided inwardly of the rear wheel house 18 (specifically, the inner wheel house 71) in the vehicle width direction. That is, the rear bulkhead 25 includes the left leg 84 connected to the rear wheel house 18, an upper cross member 85 extending inwardly in the vehicle width direction from the upper end 84a of the left leg 84, and a lower cross member 86 extending inwardly in the vehicle width direction from the lower end 84b of the left leg 84. The rear bulkhead 25 is a member which serves as a partition between the vehicle cabin 34 and a trunk 36. The rear bulkhead 25 has high rigidity and is included in the framework of the vehicle body 11.

Figure 9:
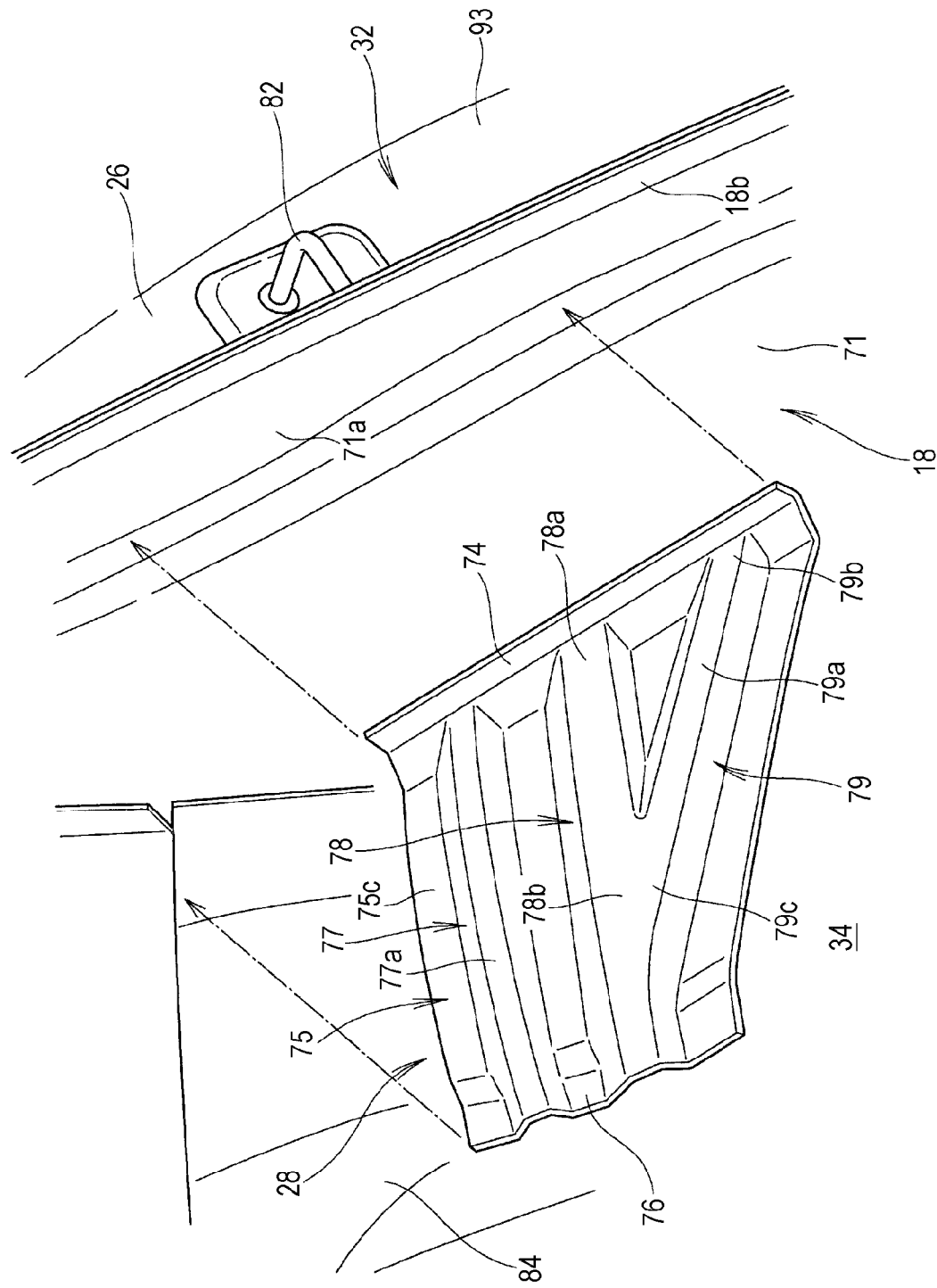
FIG. 9 is an exploded perspective view illustrating a house reinforcing member of FIG. 8 which is separated from the vehicle body.
Figure 10:
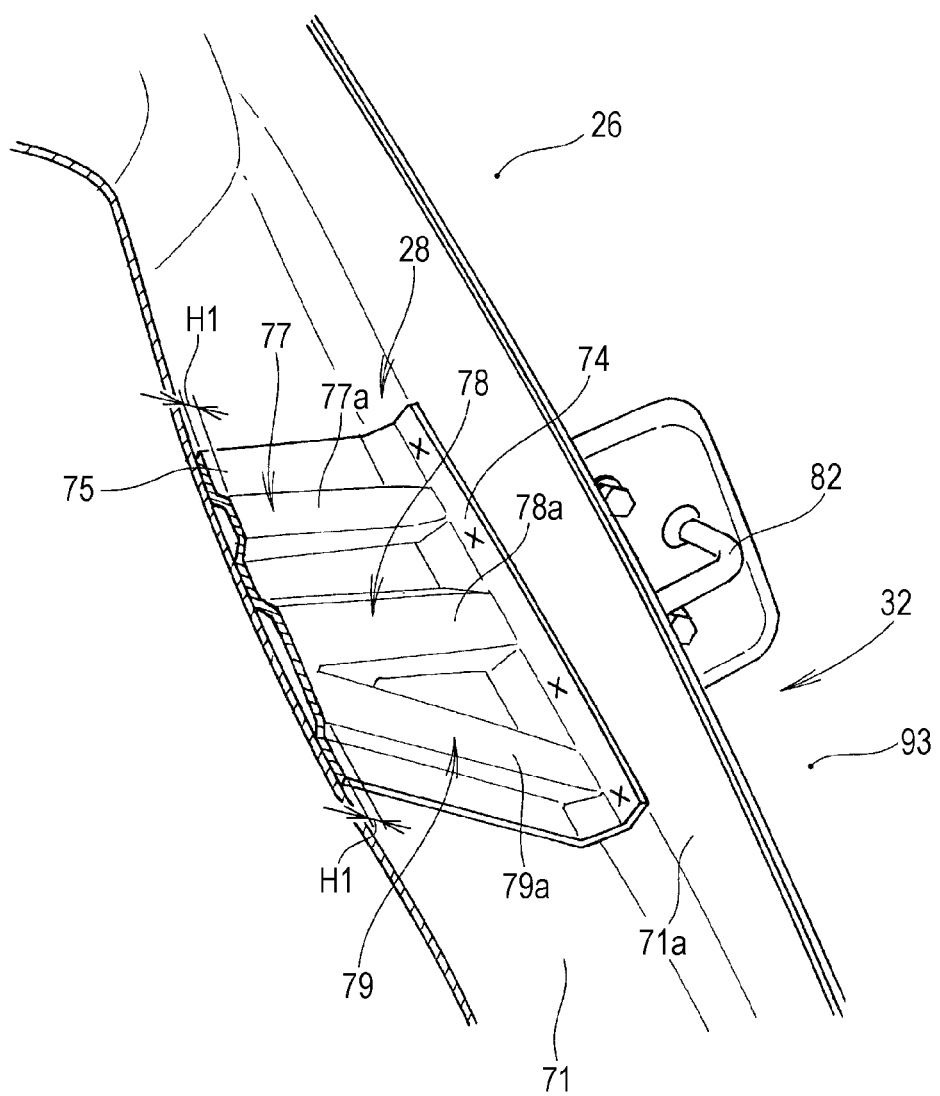
FIG. 10 is a cross-sectional view taken along line X-X of FIG. 8.

As illustrated in FIGS. 9 and 10, the upper bead 77, the middle bead 78, and the lower bead 79 are arranged one above another. Specifically, the upper bead 77 is provided in the panel portion 75 and the rear connecting portion 76. The upper bead 77 bulges toward the vehicle cabin 34 with a substantially trapezoidal cross-section, and thereby has a top portion 77a and extends substantially horizontally to the front connecting portion 74 along the upper side 75c of the panel portion 75. The top portion 77a is formed at a position which is at height H1 with respect to the panel portion 75.

The middle bead 78 is provided under the upper bead 77 in the panel portion 75 and the rear connecting portion 76. The middle bead 78 bulges toward the vehicle cabin 34 with a substantially trapezoidal cross-section, and thereby has a top portion 78a and extends substantially horizontally to the front connecting portion 74 along the upper bead 77. The top portion 78a is formed at a position which is at the height H1 with respect to the panel portion 75.

Figure 11:
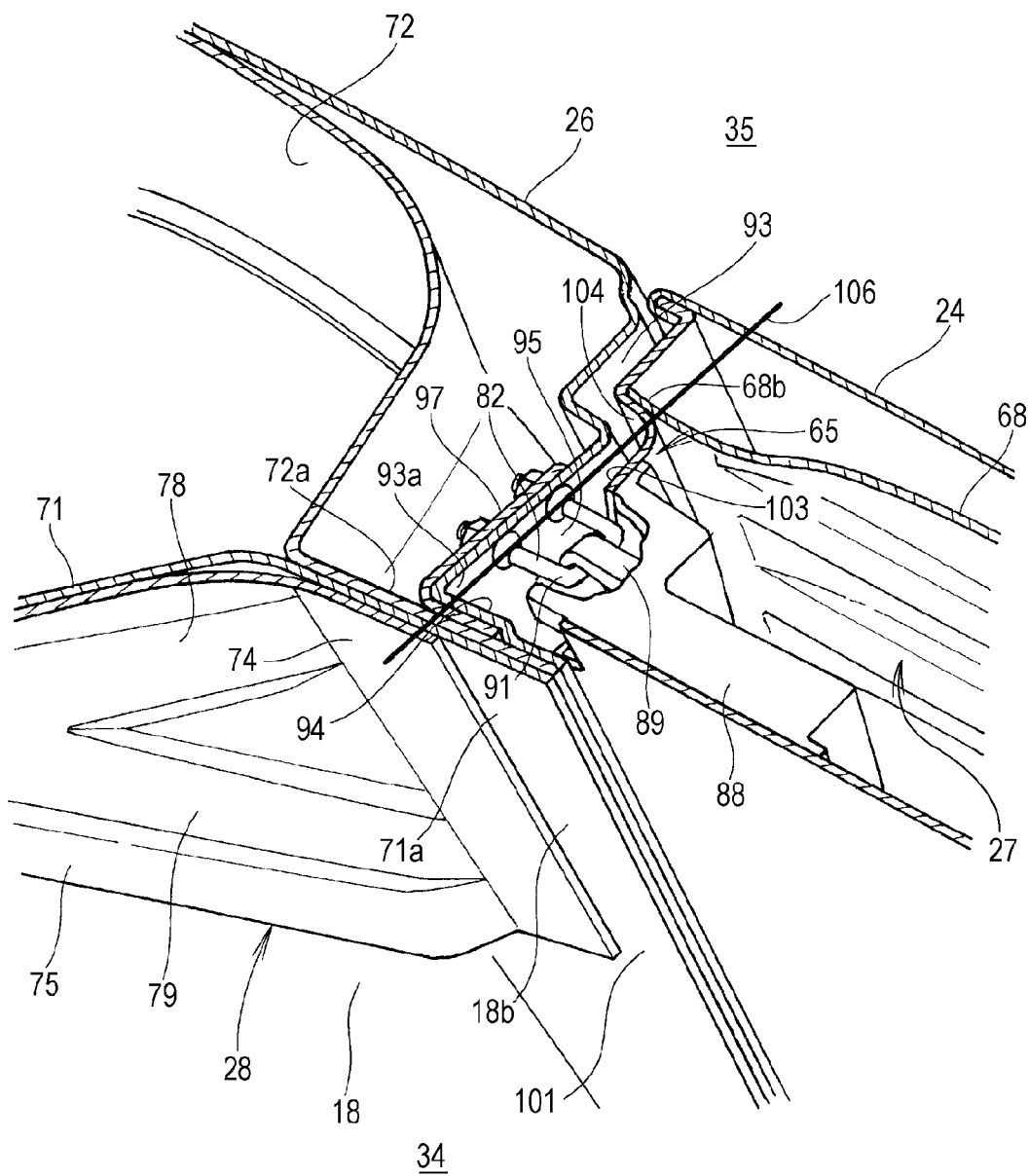
FIG. 11 is an enlarged view of portion XI of FIG. 7.

As illustrated in FIG. 11, the middle bead 78 is disposed at a position with the same height as that of a portion (hereinafter referred to as a retaining portion 91) where a door latch 89 is retained on the striker 82. The middle bead 78 corresponds to "at least one of a plurality of beads".

Returning to FIGS. 9 and 10, the lower bead 79 is provided under the middle bead 78 in the panel portion 75. The lower bead 79 bulges toward the vehicle cabin 34 with a substantially trapezoidal cross-section, and thereby has a top portion 79a and extends along the lower side 75d. The top portion 79a is formed at a position which is at the height H1 with respect to the panel portion 75.

In addition, the lower bead 79 is upwardly inclined from the front end 79b in the rearward direction of the vehicle, and the rear end 79c merges with a central portion 78b of the middle bead 78. The merging of the lower bead 79 with the central portion 78b of the middle bead 78 allows the length dimension of the lower bead 79 to be reduced in size. The lower bead 79 corresponds to "another bead formed under a bead".

That is, the panel portion 75 of the house reinforcing member 28 is provided along the front upper portion 71b of the inner wheel house 71, and the top portions 77a, 78a, 79a of the upper bead 77, the middle bead 78, and the lower bead 79 are provided at a position closer to the vehicle cabin 34 with respect to the panel portion 75. Thus, when a load is applied to the front connecting portion 74 of the house reinforcing member 28 from the outer side in the vehicle width direction, the house reinforcing member 28 is bent and deformed around the rear connecting portion 76 inwardly in the vehicle width direction. The bending deformation of the house reinforcing member 28 causes the panel portion 75 to be deformed in the tensile direction and causes the top portions 77a, 78a, 79a to be deformed in the compressing direction.

Transferred load can be partially absorbed by the house reinforcing member 28 due to the bending deformation of the house reinforcing member 28. In addition, the panel portion 75 deformed in the tensile direction, and the top portions 77a, 78a, 79a deformed in the compressing direction remain as they are. Thus, the applied load to the front connecting portion 74 can be transmitted to the rear bulkhead 25 is the house reinforcing member 28.

Here, the rear bulkhead 25 is a member included in the framework of the vehicle body 11 and has high rigidity in upper, lower, right, and left directions. Consequently, for example, even when the transmission direction (application direction) of the load from the house reinforcing member 28 to the rear bulkhead 25 is inclined with respect to the rear bulkhead 25, a load transmission rate can be maintained.

Here, the house reinforcing member 28 is provided at the outer edge of the rear seat (seat back). Thus, the bending deformation of the house reinforcing member 28 toward the vehicle cabin 34 may cause the house reinforcing member 28 to interfere with the outer edge of the rear seat (seat back). For this reason, the height H1 of the top portions 77a, 78a, 79a of the house reinforcing member 28 is set so as not to interfere with the outer edge of the seat back when the house reinforcing member 28 is bent and deformed.

The middle bead 78 of the house reinforcing member 28 is disposed at a position with the same height as that of the retaining portion 91 where the door latch 89 is retained on the striker 82. Thus, a load can be properly transmitted from the retaining portion 91 to the house reinforcing member 28 with reduced size of the house reinforcing member 28.

In addition, the lower bead 79 is formed under the middle bead 78, and the lower bead 79 is upwardly inclined in the rearward direction of the vehicle and merges with the central portion 78b of the middle bead 78. Therefore, the length dimension of the lower bead 79 can be reduced in size, and accordingly the house reinforcing member 28 can be reduced in size. In this manner, the house reinforcing member 28 can be reduced in weight due to the reduced size thereof.

In the following, the reason why the length dimension of the lower bead 79 can be reduced in size will be described. That is, as illustrated in FIGS. 5 and 8, the front connecting portion 74 is inclined downward in the forward direction of the vehicle. Thus, the front end (lower front end) 79b of the lower bead 79 is arranged at a position which is closer to the front end (beam front end) 68a (see FIG. 5) of the door beam 68 than a front end (middle front end) 78c of the middle bead 78 and a front end (upper front end) 77b of the upper bead 77.

By the arrangement of the lower front end 79b at a position closer to the beam front end 68a, a lower distance L1 between the lower end 79b and the beam front end 68a can be made smaller than a middle distance L2 between the middle front end 78c and the beam front end 68a, and an upper distance L3 between the upper front end 77b and the beam front end 68a.

With the smaller lower distance L1, when a load is applied to the beam front end 68a from the side of the vehicle, bending moment acting on the lower front end 79b can be made smaller than the bending moment which acts on the upper front end 77b as well as the bending moment which acts on the middle front end 78c. In this manner, a length dimension 14 of the lower bead 79 for reinforcement can be reduced in size, and accordingly the weight of the house reinforcing member 28 can be reduced.

As illustrated in FIGS. 8 and 11, the rear side door 24 is provided outwardly of the rear wheel house 18 in the vehicle width direction. The side outer panel 26 has an opening wall 93 which forms the rear portion of the rear door opening frame 32, and a panel flange 94 which is bent in the forward direction of the vehicle from an inner end 93a of the opening wall 93 in the vehicle width direction.

The rear door opening frame 32 has an opening which is openable and closable by the rear side door 24. In the panel opening wall 93, an opening step wall 95 is provided adjacent to the panel flange 94. The opening step wall 95 bulges toward a door rear wall (rear portion) 65 of the rear side door 24 and extends to the panel flange 94 in the vehicle width direction in a bulged manner.

A striker mounting bracket 97 having a substantially L-shaped cross-section is mounted on the opening step wall 95 from the rear of the vehicle, and the striker 82 is fixed to the striker mounting bracket 97 and the opening step wall 95. The panel flange 94 is connected to the front flange 18b of the rear wheel house 18, and thus an opening flange 101 of the rear door opening frame 32 is formed at the front flange 18b of the rear wheel house 18 and the panel flange 94. The opening step wall 95 is provided outwardly of the opening flange 101 in the vehicle width direction.

The panel opening wall 93 faces the door rear wall 65 of the rear side door 24. The door rear wall 65 has a latch wall 103 which faces the opening step wall 95 in the longitudinal direction of the vehicle, and a door step wall 104 which is provided outwardly of the latch wall 103 in the vehicle width direction, and faces the opening step wall 95 in the longitudinal direction of the vehicle.

The door latch device 88 is provided on the inner surface of the latch wall 103, and is thereby provided in the inside 27 of the rear side door 24. The rear side door 24 is maintained in a state where the rear door opening frame 32 is closed by retaining the door latch 89 of the door latch device 88 on the striker 82. In addition, the rear end 68b of the door beam 68 is connected to the door step wall 104. Therefore, the rear end 68b of the door beam 68 is provided outwardly of the striker 82 in the vehicle width direction.

Furthermore, the front connecting portion 74 and the rear end 68b of the door beam 68 are disposed so as to face the opening step wall 95 in the vehicle width direction. In addition, the rear end 68b of the door beam 68, the striker 82, and the front connecting portion 74 are provided in an overlapping manner in this order from the outside to the inside in the vehicle width direction. Therefore, a load transmitted to the rear end 68b of the door beam 68 can be transferred from the rear end 68b of the door beam 68 to the front connecting portion 74 via the retaining portion 91 (the portion where the door latch 89 is retained on the striker 82).

In addition, the striker 82 is provided on the opening step wall 95, and the front connecting portion 74 and the rear end 68b of the door beam 68 are disposed so as to face each other across the opening step wall 95. Therefore, the striker 82 and the retaining portion 91 of the door latch 89 can be arranged on a line 106 (specifically, along the line 106) joining the front connecting portion 74 and the rear end 68b of the door beam 68.

Consequently, the load transmitted (distributed) to the rear end 68b of the door beam 68 can be substantially linearly transferred to the front connecting portion 74 of the house reinforcing member 28 via the rear end 68b of the door beam 68 and the retaining portion 91. In this manner, the transmission efficiency of the load can be improved by substantially linearly transferring the load.

The striker mounting bracket 97 is disposed on the opening step wall 95 of the side outer panel 26, and the striker 82 is fixed to the striker mounting bracket 97. In addition, the rear end 68b of the door beam 68 is connected to the door step wall 104 which faces the opening step wall 95 of the side outer panel 26.

Therefore, the striker mounting bracket 97 can be arranged on the line 106 joining the front connecting portion 74 and the rear end 68b of the door beam 68. Consequently, the load transmitted (distributed) to the rear end 68b of the door beam 68 can be substantially linearly transferred to the front connecting portion 74 of the house reinforcing member 28 via the rear end 68b of the door beam 68, the striker 82, and the striker mounting bracket 97, and thus the transmission efficiency of the load can be improved.

Figure 12A:
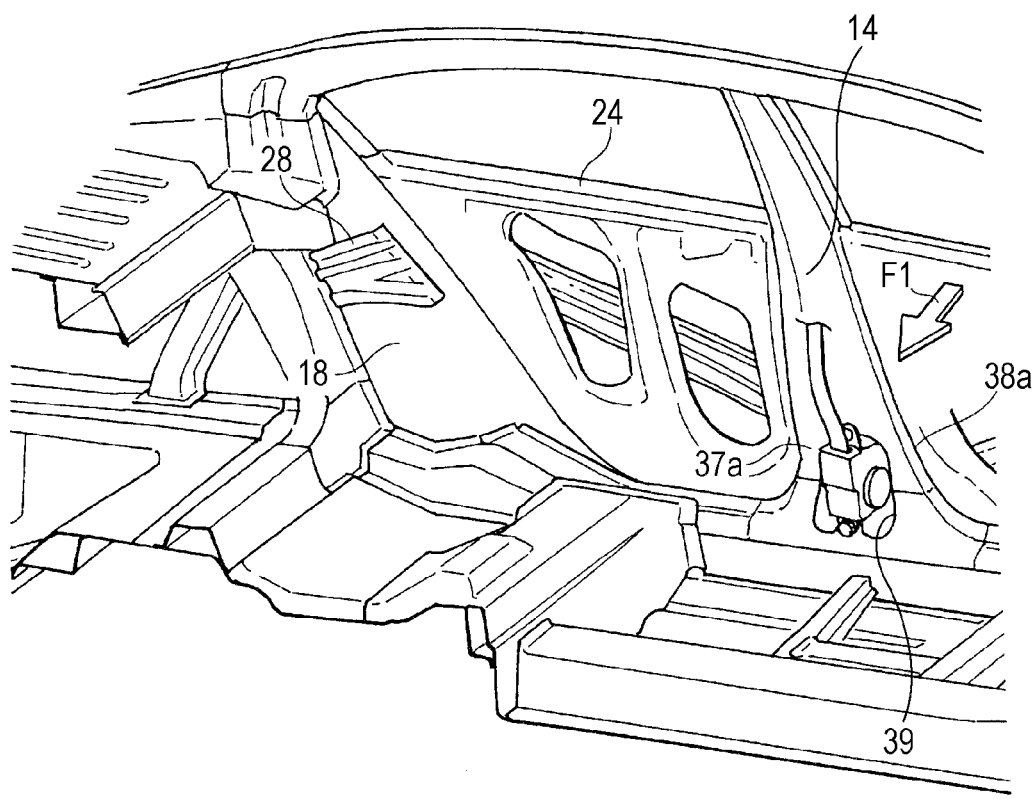
FIG. 12A and FIG. 12B are explanatory view of an example in which an impact load is applied from the side of the vehicle to the center pillar according to the present disclosure.
Figure 12B:
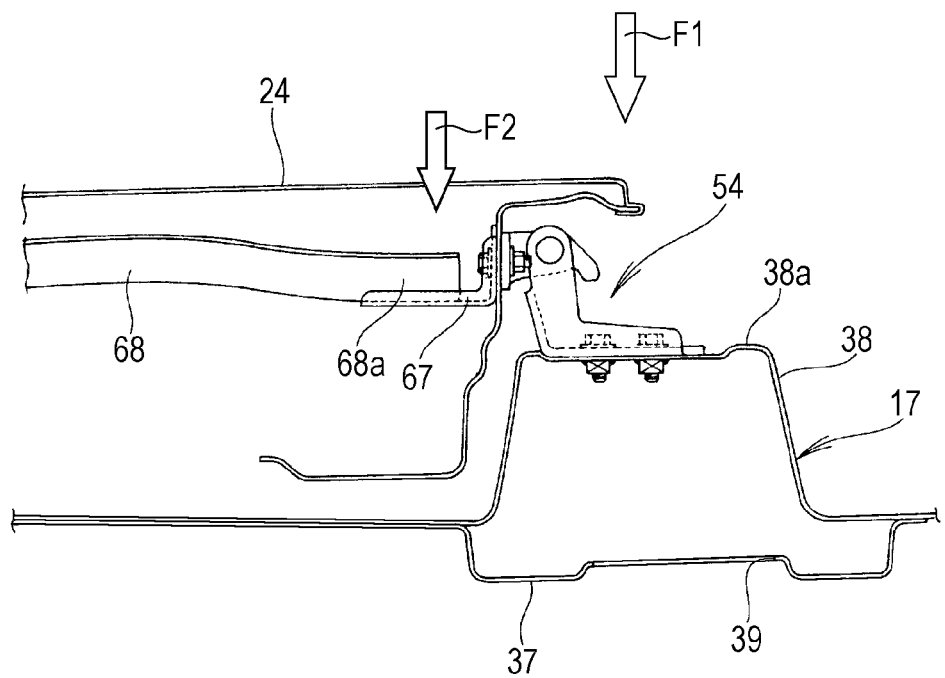

Next, an example in which an impact load is applied from the side of the vehicle to the center pillar will be described with reference to FIGS. 12A to 15B. As illustrated in FIG. 12A, an impact load F1 is applied to a portion (specifically, the lower portions 37a, 38a of the center pillar 14) from the side of the vehicle, the portion being apart from the rear wheel house 18. As illustrated in FIG. 12B, when the impact load F1 is applied to the lower portions 37a, 38a of the center pillar 14, the impact load F1 is transmitted as a load F2 to the front end 68a of the door beam 58 via the lower door hinge 54 and the beam mounting bracket 67.

Figure 13A:
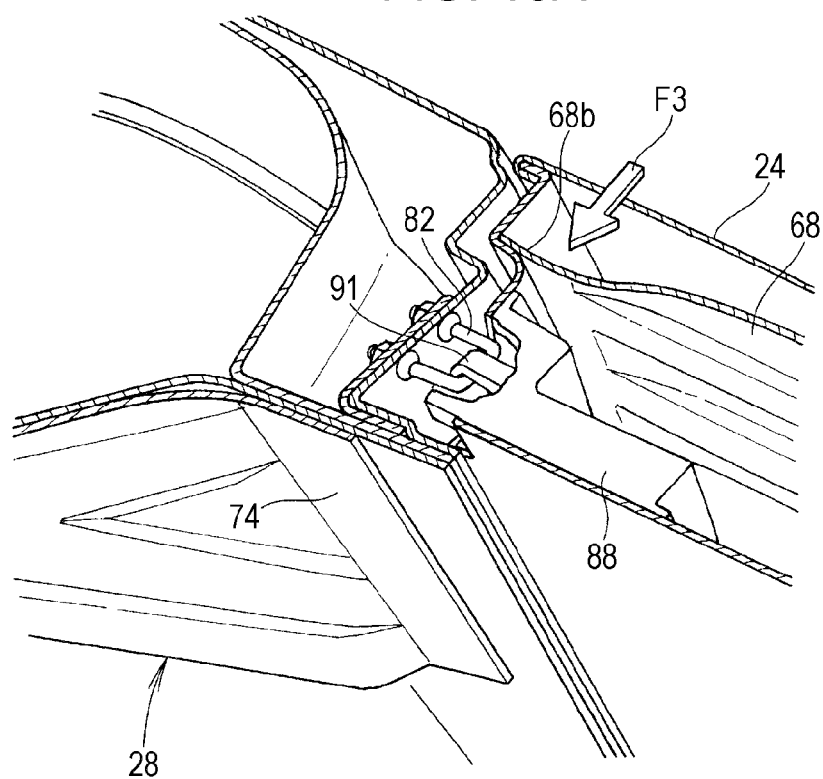
FIG. 13A and FIG. 13B are explanatory view of an example in which a load is transmitted to a house reinforcing member according to the present disclosure.
Figure 13B:
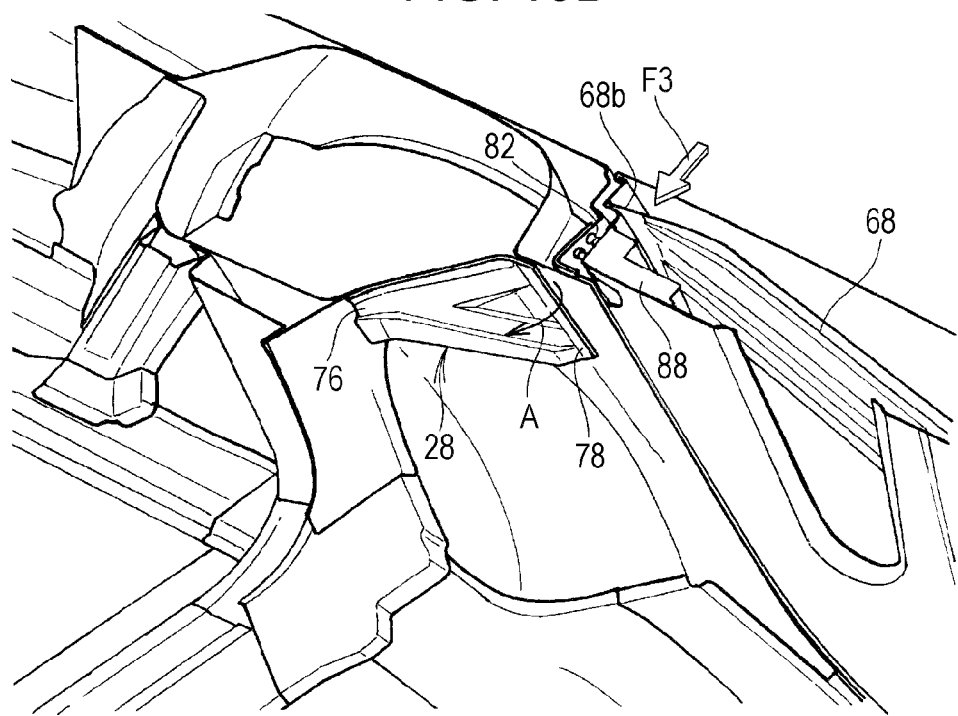

As illustrated in FIG. 13A, the load F2 transmitted (distributed) to the front end 68a (see FIG. 12B) of the door beam 68 is transferred to the rear end 68b of the door beam 68 as a load F3. The transferred load F3 is transferred from the rear end 68b of the door beam 68 to the front connecting portion 74 via the retaining portion 91 (see FIG. 11). As illustrated in FIG. 13B, the load F3 is transferred to the front connecting portion 74, and the house reinforcing member 28 is thereby bent and deformed around the rear connecting portion 76 inwardly in the vehicle width direction as indicated by arrow A.

Figure 14A:
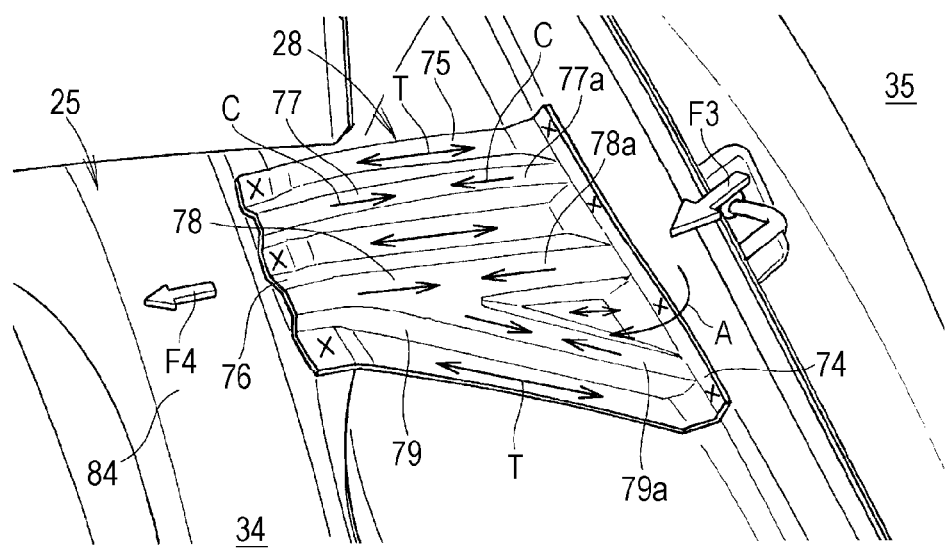
FIG. 14A and FIG. 14B are explanatory view of an example in which a load is supported by a rear bulkhead according to the present disclosure.

As illustrated in FIG. 14A, the bending deformation of the house reinforcing member 28 causes the panel portion 75 to be deformed in the tensile direction and causes the to portions 77a, 78a, 79a of the upper bead 77, the middle bead 78, and the lower bead 79 to be deformed in the compressing direction.

The transferred load F3 is partially absorbed by the house reinforcing member 28 due to the bending deformation of the house reinforcing member 28. In addition, a tensile force acts on the panel portion 75, and a compressive force C acts on the top portions 77a, 78a, 79a. In the above state, the load transferred to the front connecting portion 74 is transferred to the left leg 84 of the rear bulkhead 25 as a load F4 via the house reinforcing member 28.

Figure 14B:
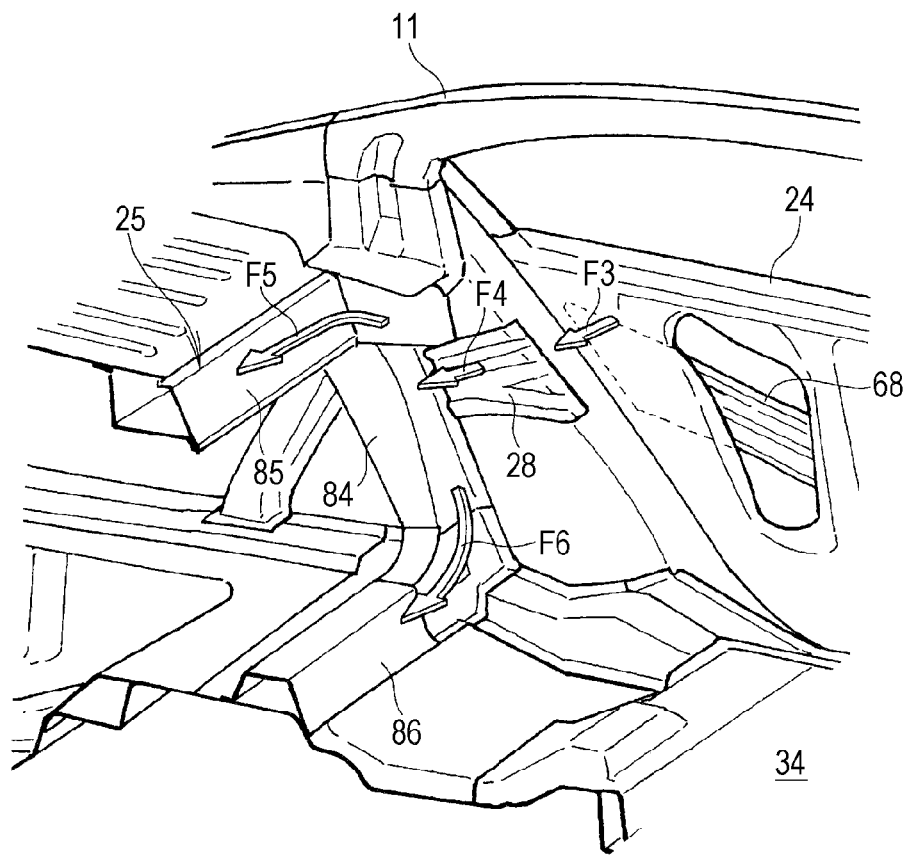

As illustrated in FIG. 14B, the load F4 transferred to the left leg 84 is transferred to the upper cross member 85 as a load F5 via the left leg 84, and to the lower cross member 86 as a load F6. Here, the rear bulkhead 25 is a member included in the framework of the vehicle body 11 and has high rigidity. Thus, the load F5 transferred to the upper cross member 85 and the load F6 transferred to the lower cross member 86 can be supported by the rear bulkhead 25. Thus, severe deformation of the rear wheel house 18 toward the vehicle cabin 34 by the load F4 can be prevented.

In this manner, when the impact load F1 (see FIG. 12A) is applied to the lower portions 37a, 38a of the center pillar 14 from the side of the vehicle, which are apart from the rear wheel house 18, the applied impact load F1 can be distributed to the rear wheel house 18 as the load F3. Thus, severe deformation of the center pillar 14 toward the vehicle cabin 34 by the impact load F1 can be prevented, the impact load F1 being applied from the side of the vehicle.

Figure 15A:
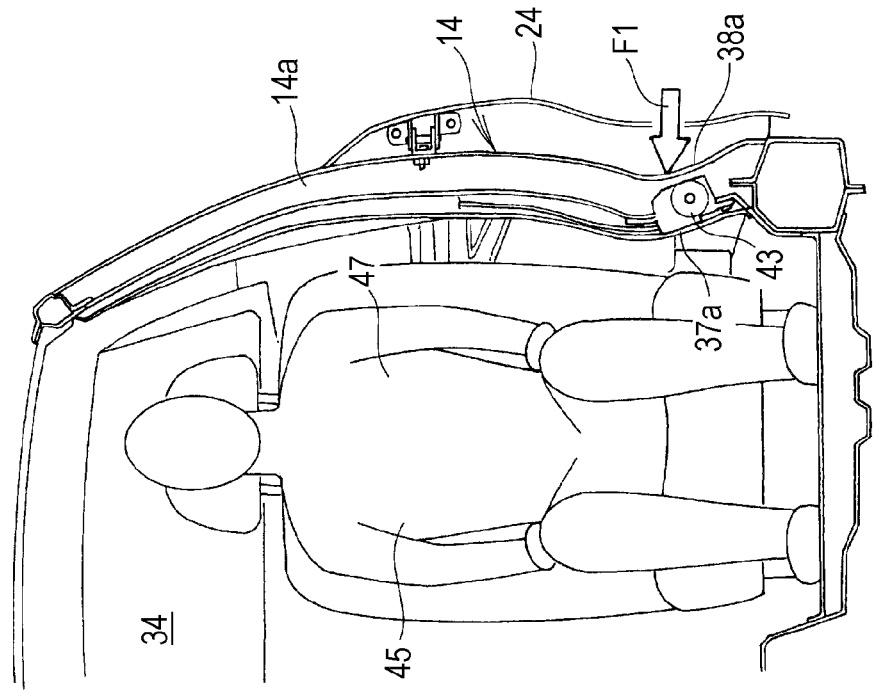
FIG. 15A and FIG. 15B are explanatory view of an example in which the chest of a passenger is protected against an impact load by the vehicle body side structure according to the present disclosure.

As illustrated in FIG. 15A, the retractor opening 39 is formed at the lower portion 37a of the center pillar 14, and the less rigid portion 41 is formed at the lower portion 38a, and thus the retractor opening 39 and the less rigid portion 41 are disposed near the lower body (hip) 46 of the passenger 45.

Figure 15B:
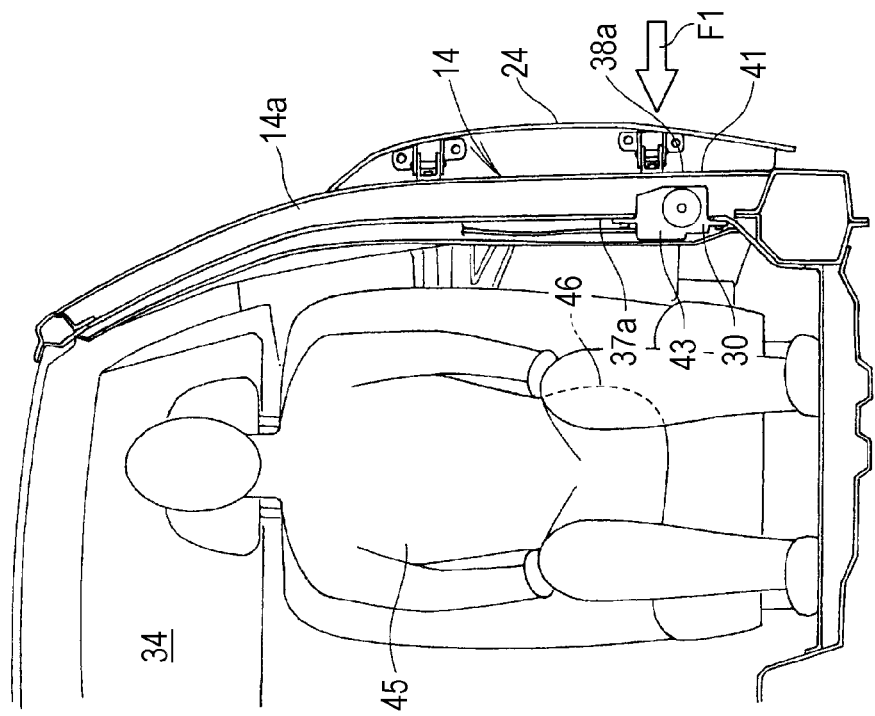

As illustrated in FIG. 15B, the lower portions 37a, 38a of the center pillar 14 are deformed toward the vehicle cabin 34 by the impact load F1. Thus, the portion 14a of the center pillar 14 located near the upper body (chest) 47 of the passenger 45 can be separated (moved) away from the chest 47 of the passenger 45. Consequently, the chest 47 of the passenger 45 can be prevented from being damaged by the impact load F1.

The vehicle body side structure according to the present disclosure is not limited to the above-described embodiment, and various modifications and improvements can be made as needed. For example, in the above embodiment, the example has been described in which the front connecting portion 74 is connected to the inner wheel house 71 (the flange 71a), and the rear connecting portion 75 is connected to the rear bulkhead 25 (the left leg 84). However, without being limited to this example, the panel portion 75 may be connected to the inner wheel house 71 (the front upper portion 71b) in addition to the connection of the front connecting portion 74 and the rear connecting portion 76.

Furthermore, in the above embodiment, the example has been described in which both the retractor opening 39 and the less rigid portion 41 are provided in the lower portion of the center pillar 14. However, without being limited to this example, either one of the retractor opening 39 and the less rigid portion 41 may be provided in the lower portion of the center pillar 14. In this case, the same effect as in the embodiment may be achieved.

The shapes and configuration of the components illustrated in the above-described embodiment are not limited to those illustrated, the components including the vehicle body side structure, the center pillar, the rear wheel house, the rear side door, the rear bulkhead, the side outer panel, the house reinforcing member, the rear door opening frame, the retractor opening, the less rigid portion, the retractor, the door beam, the front connecting portion, the panel portion, the rear connecting portion, the upper, middle, lower beads, the upper and lower door hinges, the beam mounting bracket, the striker, the door latch, the opening wall of the rear door opening frame, the retaining portion, the opening step wall, the striker mounting bracket, the opening flange, and the door step wall.

The present disclosure is preferably applied to an automobile having a vehicle body side structure in which a rear bulkhead is provided in a rear wheel house, and a side door is provided forwardly of the rear wheel house.

We claim:

1. A vehicle body side structure comprising:
a rear bulkhead provided inwardly of a rear wheel house in a vehicle width direction, wherein the rear bulkhead includes a leg member connected to the rear wheel house, an upper cross member extending inwardly in the vehicle width direction from an upper end of the leg member, and a lower cross member extending inwardly in the vehicle width direction from a lower end of the leg member;
a side outer panel connected to an outside of the rear wheel house in the vehicle width direction; the side outer panel including a door opening;
a striker provided at a rear portion of the door opening;
a side door configured to open and close the door opening, wherein the side door includes a door latch engageable with the striker and a door beam for reinforcement inside the side door, wherein the rear wheel house includes a front flange and the side outer panel includes a panel flange, and the front flange and the panel flange constitute an opening flange defining an edge of the door opening; and a house reinforcing member mounted on a front portion of the rear wheel house, the house reinforcing member including:

a front connecting portion connected to the opening flange and provided inwardly of the striker in the vehicle width direction, a panel portion which extends from the front connecting portion obliquely rearward and inwardly in the vehicle width direction and along the front portion of the rear wheel house, and a rear connecting portion which projects from a rear end of the panel portion and is connected to the leg member of the rear bulkhead, wherein a rear end of the door beam is provided outwardly of the striker in the vehicle width direction, and the rear end of the door beam, the striker, and the front connecting portion are provided in an overlapping manner in this order from outside to inside in the vehicle width direction.

2. The vehicle body side structure according to claim 1, wherein the front connecting portion of the house reinforcing member is inclined downward toward the forward direction of the vehicle, the house reinforcing member has a plurality of beads arranged one above another, at least one of the beads is disposed at a position at the same height as a retaining portion including the door latch and the striker, and another bead formed below the at least one bead is inclined upward from a front end thereof toward a rearward direction of the vehicle to merge with a central portion of the at least one bead.

3. The vehicle body side structure according to claim 1, further comprising a center pillar including a retractor opening in a lower portion thereof for housing a retractor for a seat belt and configured to rotatably support a front portion of the side door, wherein a front end of the door beam is disposed outwardly of the retractor opening in the vehicle width direction so as to face the retractor opening.

4. The vehicle body side structure according to claim 1, further comprising a center pillar including a less rigid portion than other portion in a lower portion thereof and configured to rotatably support a front portion of the side door, wherein a front end of the door beam is disposed outwardly of the less rigid portion in the vehicle width direction so as to face the less rigid portion.

5. The vehicle body side structure according to claim 1, wherein the side outer panel includes an opening step wall extending in the vehicle width direction, the opening step wall being provided outwardly of the opening flange in the vehicle width direction, the opening step wall including the striker thereon, and the front connecting portion and the rear end of the door beam are disposed so as to face the opening step wall.

6. The vehicle body side structure according to claim 5, wherein the side door includes a door step wall which faces the opening step wall of the side outer panel, the door step wall is connected to the rear end of the door beam, and the opening step wall includes a striker mounting bracket disposed thereon to fix the striker.

7. The vehicle body side structure according to claim 1, wherein the side door includes a beam mounting bracket and a front end of the door beam is fixed to a front portion of the side door via the beam mounting bracket, the side door is supported by a center pillar via a plurality of door hinges arranged one above another, and the beam mounting bracket is fixed to one of the door hinges disposed at a lowest position among the door hinges.

8. The vehicle body side structure according to claim 1, wherein the panel portion is connected to the front portion of the rear wheel house.

9. The vehicle body side structure according to claim 1, wherein the house reinforcing member includes a bead extending substantially horizontally from the rear connecting portion to the front connecting portion, the bead bulges toward a vehicle cabin to have a crest portion.

\* \* \* \* \*